United States Patent
Rah et al.

(10) Patent No.: US 11,465,094 B2
(45) Date of Patent: Oct. 11, 2022

(54) PSA SEPARATION-PURIFICATION SYSTEM AND PROCESS INTEGRATED WITH WATER GAS SHIFT REACTION PROCESS

(71) Applicant: HANWOUL ENGINEERING INC., Gunpo-si (KR)

(72) Inventors: Jong Nam Rah, Gunpo-si (KR); Jong Il Rah, Gunpo-si (KR); Yang-Jin Kim, Suwon-si (KR)

(73) Assignee: HANWOUL ENGINEERING INC., Gunpo-si (KR)

( * ) Notice: Subject to any disclaimer, the term of this patent is extended or adjusted under 35 U.S.C. 154(b) by 300 days.

(21) Appl. No.: 16/738,048

(22) Filed: Jan. 9, 2020

(65) Prior Publication Data

US 2021/0170322 A1    Jun. 10, 2021

(30) Foreign Application Priority Data

Dec. 6, 2019 (KR) .......................... 10-2019-0161360

(51) Int. Cl.
*B01D 53/047* (2006.01)
*B01D 53/04* (2006.01)
(Continued)

(52) U.S. Cl.
CPC .......... *B01D 53/047* (2013.01); *B01D 5/0072* (2013.01); *B01D 53/0407* (2013.01);
(Continued)

(58) Field of Classification Search
CPC .... B01D 53/02; B01D 53/04; B01D 53/0438; B01D 53/0454; B01D 53/0462; B01D 53/047; B01D 53/0473; B01D 53/0476; B01D 53/053; B01D 5/0072; B01D 53/0407; B01D 53/0423; B01D 53/265; B01D 5/0012; B01D 2257/108; B01D 2257/504; B01D 2256/16; B01D 2259/40083; Y02C 20/40; Y02P 70/10; C01B 3/323; C01B 3/56; C01B 2203/043;
(Continued)

(56) References Cited

U.S. PATENT DOCUMENTS 7,276,095 B2 * 10/2007 Gittleman ................ C01B 3/34
48/107
2008/0314245 A1 * 12/2008 Hershkowitz ...... B01D 53/0423
95/115

(Continued)

FOREIGN PATENT DOCUMENTS

JP       2011152526 A    8/2011
KR    1020110048315 A    5/2011

*Primary Examiner* — Gabriel E Gitman
(74) *Attorney, Agent, or Firm* — STIP Law Group, LLC (57) ABSTRACT

Disclosed herein are a pressure swing adsorption (PSA) separation-purification system and process integrated with a water gas shift reaction process. According to the invention, the adsorption/desorption heat of a PSA separation-purification device is controlled using a reaction effluent and a refrigerant of a water gas shift reaction process without using additional components such as a heat exchanger or a heating means or without changing the structure of a PSA separation-purification device, thus achieving the best separation-purification performance of the PSA separation-purification device.

11 Claims, 4 Drawing Sheets

(51) Int. Cl.
  *B01D 5/00*  (2006.01)
  *B01D 53/26*  (2006.01)
  *C10K 1/00*  (2006.01)
  *C01B 3/56*  (2006.01)

(52) U.S. Cl.
  CPC ....... *B01D 53/0438* (2013.01); *B01D 53/265* (2013.01); *B01D 5/0012* (2013.01); *B01D 2257/108* (2013.01); *B01D 2257/504* (2013.01); *C01B 3/56* (2013.01); *C01B 2203/0475* (2013.01); *C10K 1/00* (2013.01); *C10K 1/005* (2013.01)

(58) Field of Classification Search
  CPC .. C01B 2203/0475; C10K 1/00; C10K 1/001; C10K 1/005
  See application file for complete search history.

(56) References Cited

U.S. PATENT DOCUMENTS

2013/0011326 A1* 1/2013 Grover .................... C10K 1/30
                                                    423/437.1
2013/0047842 A1* 2/2013 Halder .................. B01D 53/06
                                                    96/115

* cited by examiner

PSA SEPARATION-PURIFICATION SYSTEM AND PROCESS INTEGRATED WITH WATER GAS SHIFT REACTION PROCESS

CROSS REFERENCE TO RELATED APPLICATION

The present application claims priority to Korean Patent Application No. 10-2019-0161360, filed Dec. 6, 2019, the entire contents of which is incorporated herein for all purposes by this reference.

BACKGROUND OF THE INVENTION

Field of the Invention

The present invention relates to a pressure swing adsorption (PSA) separation-purification system and process integrated with a water gas shift reaction process. More particularly, the invention relates to a PSA separation-purification system and process integrated with a water gas shift reaction process, which improve the adsorption and desorption heat exchange performance of a PSA separation-purification system using a reaction effluent and a refrigerant of a water gas shift reaction process.

Description of the Related Art

Gas purity management is very important in a general gas industries as well as high-tech industries, such as a factory producing semiconductors and LCDs. Thus, in order to improve performance, various gas purifying facilities, such as a PSA separation-purification device, a temperature swing adsorption (TSA) separation-purification device, or a catalyst and Getter purifier are used. Particularly, as the performance improvement of the separation-purification device is directly related to the performance of a product in the high-tech industry such as the semiconductor, the device has more utilization and requires higher level.

Moreover, the separation-purification device having improved performance can minimize the size of a product, thus leading to a reduction in direct/indirect investment costs, such as reducing an investment in installation space. A conventional pressure swing adsorption (hereinafter referred to as "PSA") separation-purification device is a simple system in which each column is independently configured and operated to perform an adsorption process during purification and perform a desorption process during recycling.

Furthermore, as most of adsorbents used in the separation-purification device generate adsorption heat during adsorption and absorb heat during desorption, it is difficult to show the best purifying performance.

Thereby, Korean Patent Application Publication No. 10-2011-0048315 discloses a PSA type purifier, which combines an adsorption column in a adsorption process with an adsorption column in a desorption process, thus achieving a heat exchange structure of high heat efficiency. Japanese Patent Application Publication No. 2011-152526 discloses an adsorption tower, which arranges a heat transfer pipe in the adsorption tower filled with an adsorbent to deliver a heat medium, thus performing a heat exchange between the heat medium and the adsorbent.

However, the related art including the cited patent documents is problematic in that heat is not sufficiently to the adsorbent, so that it requires much time for heating. Further, in order to overcome the drawback, the structure of the separation-purification device should be changed, and a heat exchanger or a heat supply device should be additionally installed. As respective units for forming the heat supply device or the heat exchanger and heat exchangers are distributed and arranged over the installed heat supply device or heat exchanger, an installation area for the separation-purification device increases and the number of connecting pipes increases. Consequently, a heat loss amount increases, and inspection and maintenance are inconvenient.

Therefore, there is a need for technology that can easily control adsorption/desorption heat without additionally installing a heat exchanger and a heating means in the PSA separation-purification system or without changing the structure of the PSA separation-purification device.

Documents of Related Art (Patent Document 1) Korean Patent Application Publication No. 10-2011-0048315 (May 11, 2011)
(Patent Document 2) Japanese Patent Application Publication No. 2011-152526 (Aug. 11, 2011)

SUMMARY OF THE INVENTION

The present invention has been made in order to solve the above-mentioned problems in the prior art and an object of the present invention is to provide a PSA separation-purification system and process integrated with a water gas shift reaction process, in which the adsorption/desorption heat of a PSA separation-purification device is controlled using a reaction effluent and a refrigerant of a water gas shift reaction process without using additional components such as a heat exchanger or a heating means or without changing the structure of a PSA separation-purification device, thus achieving the best separation-purification performance of the PSA separation-purification device.

In order to achieve the object of the present invention, the invention may provide a PSA separation-purification system integrated with the water gas shift reaction process, the system including: a water gas shift reaction unit performing a water gas shift reaction of carbon-monoxide containing gas with steam to discharge a reaction effluent; a condenser separating and eliminating moisture contained in the reaction effluent; a PSA unit having at least one adsorption column in which adsorption/desorption processes are alternately performed to separate the reaction effluent from which the moisture has been eliminated into hydrogen and carbon dioxide, thus purifying the reaction effluent through a PSA method; and a refrigerant supply unit supplying a refrigerant to the condenser and/or the PSA unit, wherein the PSA unit may include a heat medium path for heat exchange in the at least one adsorption column, so that the refrigerant from the refrigerant supply unit may pass through the heat medium path for the heat exchange to eliminate adsorption heat of the PSA unit in an adsorption process of the PSA unit, and the reaction effluent of the water gas shift reaction unit may pass through the heat medium path for the heat exchange to provide desorption heat to the PSA unit in a desorption process.

The reaction effluent passing through the heat medium path for the heat exchange of the PSA unit may be supplied to the condenser to separate and eliminate the moisture from the reaction effluent, and then may be supplied to the adsorption column that is in the adsorption process of the PSA unit to be separated into hydrogen and carbon dioxide and purified.

The heat medium path for the heat exchange of the PSA unit may be formed in the PSA unit in a finned tube type or in a shell and tube type.

The temperature of the reaction effluent discharged from the water gas shift reaction unit may range from 200° C. to 500° C.

The temperature of the refrigerant may range from −30° C. to 30° C.

The refrigerant may be a coolant.

The invention may provide a PSA separation-purification process integrated with a water gas shift reaction process, the process including: (a) a water gas shift reaction step of supplying carbon-monoxide containing gas and steam to a water gas shift reaction unit, and discharging a reaction effluent produced through a water gas shift reaction of the supplied carbon-monoxide containing gas and steam; (b) a condensation step of supplying the reaction effluent to a condenser, and separating and eliminating moisture contained in the supplied reaction effluent; (c) a PSA step of supplying the reaction effluent from which the moisture is eliminated to a PSA unit having at least one adsorption column where adsorption/desorption processes are alternately performed, and separating the supplied reaction effluent from which the moisture has been eliminated into hydrogen and carbon dioxide to purify the reaction effluent through a PSA method; and (d) a refrigerant supply step of supplying a refrigerant to the PSA unit of the PSA step and/or the condenser of the condensation step, wherein (c) step may provide desorption heat to the PSA unit by causing the reaction effluent of (a) step to pass through a heat medium path for heat exchange formed in at least one adsorption column during a desorption process of the PSA unit, and may eliminate adsorption heat of the PSA unit by causing the refrigerant of (d) step to pass through the heat medium path for heat exchange formed in at least one adsorption column during an adsorption process.

The temperature of the reaction effluent produced at the water gas shift reaction step may range from 200 r to 500° C.

The temperature of the refrigerant may range from −30° C. to 30° C.

The refrigerant may be a coolant.

According to the present invention, heat that is taken away in desorption during the recycling of a PSA unit is compensated using the heat of a reaction effluent discharged from a water gas shift reaction unit, thus improving desorption efficiency, and the adsorption heat of the PSA unit is eliminated using a refrigerant for eliminating steam from the reaction effluent discharged from a conventional water gas shift reaction unit during adsorption, thus improving the separation-purification performance of a PSA separation-purification device, and consequently achieving the best separation-purification performance of the PSA separation-purification device without using additional components such as a heat exchanger or a heating means or without changing the structure of a PSA unit and the path of a heat exchange medium.

Furthermore, according to the present invention, the reaction effluent and the refrigerant discharged from an existing water gas shift reaction unit are utilized to perform the heat exchange of a PSA unit, thus reducing energy input from an outside and simultaneously reducing an operation cost.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Unless otherwise defined, all technical and scientific terms used herein have the same meaning as commonly understood by those skilled in the art. Generally, nomenclature used herein is well known in the art and commonly used.

Furthermore, terms that are to be described below are terms defined in consideration of the function of the present invention, which may vary according to the intention of a user or an operator or a precedent. Therefore, these terms should be defined on the basis of the contents of the specification.

Herein, terms such as "include", "comprise", or "have" represent that one or more features, numbers, steps, operations, elements, components or combinations described in the specification exist, but do not exclude the possibility of the presence or addition of other features, numbers, steps, operations, elements, components or combinations thereof.

In an aspect, the present invention provides a PSA separation-purification system integrated with the water gas shift reaction process, the system including a water gas shift reaction unit performing a water gas shift reaction of carbon-monoxide containing gas with steam to discharge a reaction effluent; a condenser separating and eliminating moisture contained in the reaction effluent; a PSA unit having at least one adsorption column in which adsorption/desorption processes are alternately performed to separate the reaction effluent from which the moisture has been eliminated into hydrogen and carbon dioxide, thus purifying the reaction effluent through a PSA method; and a refrigerant supply unit supplying a refrigerant to the condenser and/or the PSA unit, wherein the PSA unit comprises a heat medium path for heat exchange in the at least one adsorption column, so that the refrigerant from the refrigerant supply unit passes through the heat medium path for the heat exchange to eliminate adsorption heat of the PSA unit in an adsorption process of the PSA unit, and the reaction effluent of the water gas shift reaction unit passes through the heat medium path for the heat exchange to provide desorption heat to the PSA unit in a desorption process.

In another aspect, the present invention provides a PSA separation-purification process integrated with a water gas shift reaction process, the process including (a) a water gas shift reaction step of supplying carbon-monoxide containing gas and steam to a water gas shift reaction unit, and discharging a reaction effluent produced through a water gas shift reaction of the supplied carbon-monoxide containing gas and steam; (b) a condensation step of supplying the reaction effluent to a condenser, and separating and eliminating moisture contained in the supplied reaction effluent; (c) a PSA step of supplying the reaction effluent from which the moisture is eliminated to a PSA unit having at least one adsorption column where adsorption/desorption processes are alternately performed, and separating the supplied reaction effluent from which the moisture has been eliminated into hydrogen and carbon dioxide to purify the reaction effluent through a PSA method; and (d) a refrigerant supply step of supplying a refrigerant to the PSA unit of the PSA step and/or the condenser of the condensation step, wherein (c) step provides desorption heat to the PSA unit by causing the reaction effluent of (a) step to pass through a heat medium path for heat exchange formed in at least one adsorption column during a desorption process of the PSA unit, and eliminates adsorption heat of the PSA unit by causing the refrigerant of (d) step to pass through the heat medium path for heat exchange formed in at least one adsorption column during an adsorption process.

Hereinafter, the preferred embodiments of the present invention will be described in detail with reference to the accompanying drawings.

Figure 1:
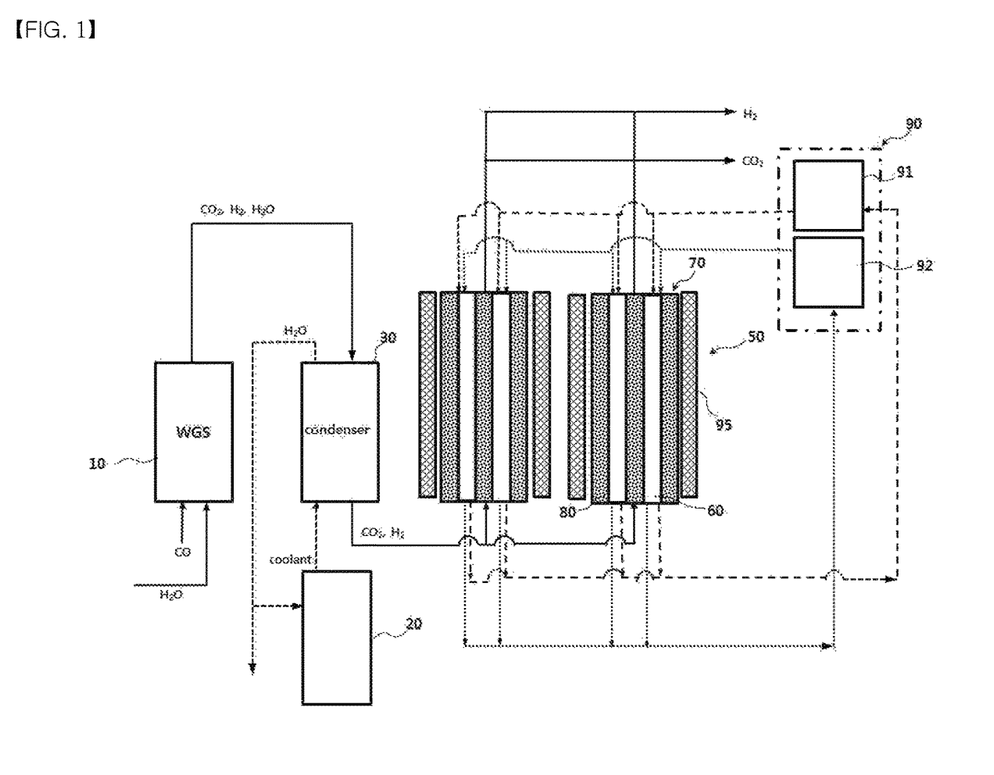
FIG. 1 is a diagram showing the configuration of a conventional PSA separation-purification system integrated with a water gas shift reaction process.
Figure 2:
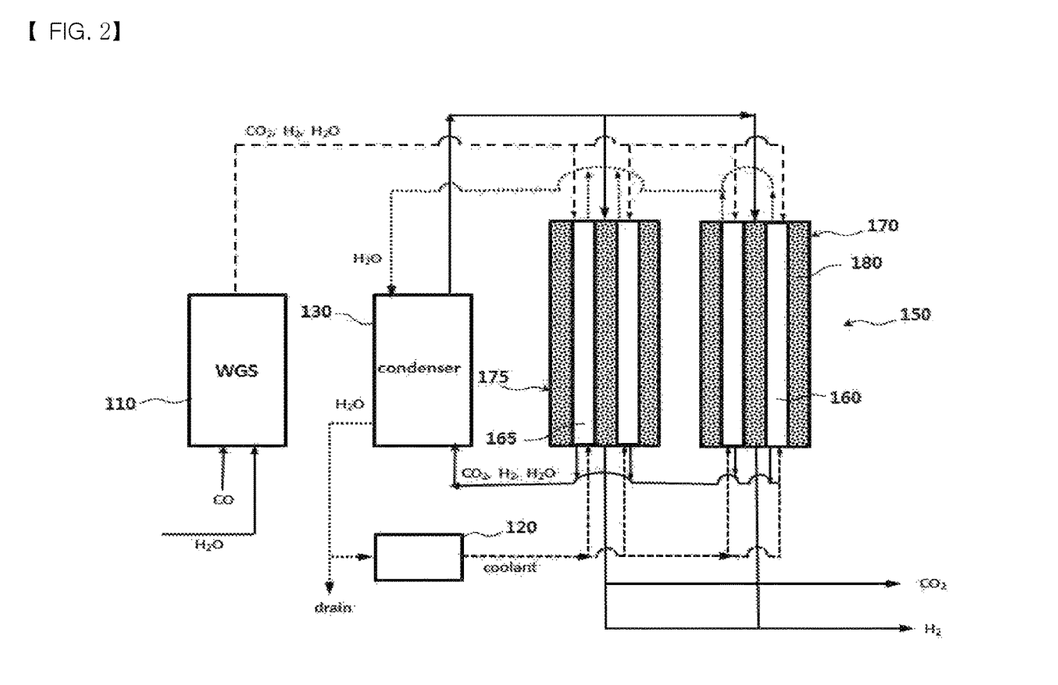
FIG. 2 is a diagram showing the configuration of a PSA separation-purification system integrated with a water gas shift reaction process according to an embodiment of the present invention.
Figure 3:
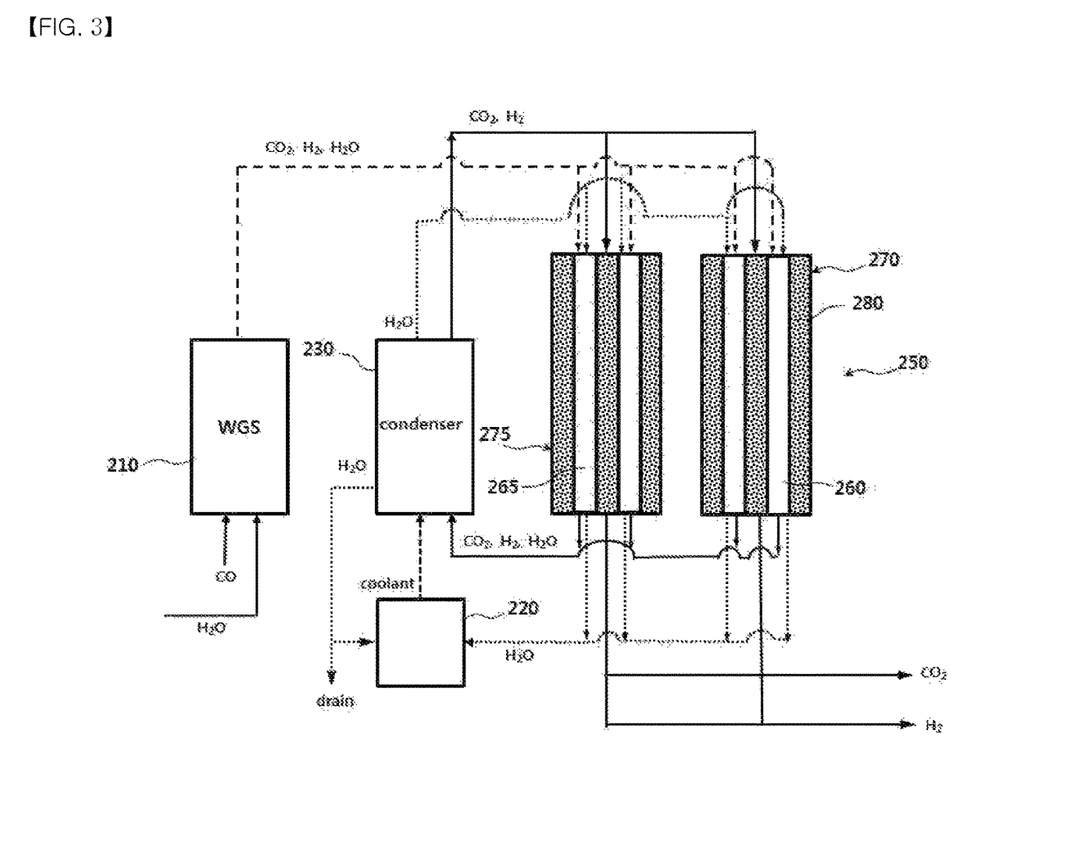
FIG. 3 is a diagram showing the configuration of a PSA separation-purification system integrated with a water gas shift reaction process according to another embodiment of the present invention.
Figure 4:
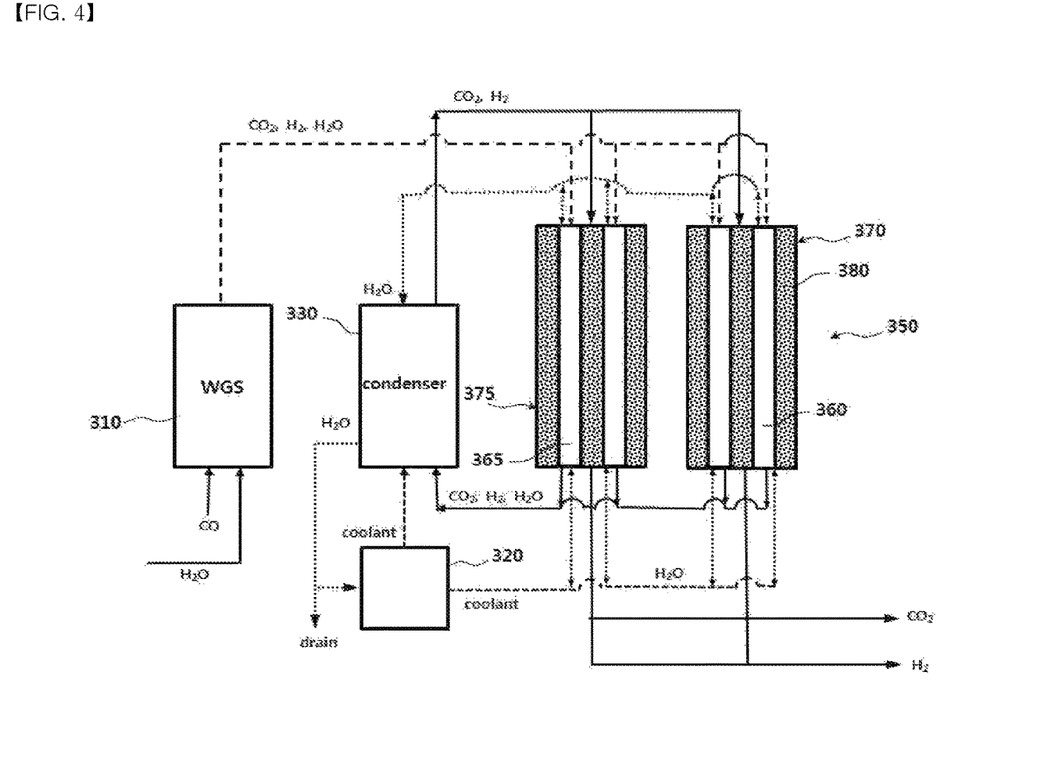
FIG. 4 is a diagram showing the configuration of a PSA separation-purification system integrated with a water gas shift reaction process according to a further embodiment of the present invention.

FIG. 1 is a diagram showing the configuration of a conventional PSA separation-purification system integrated with a water gas shift reaction process, FIG. 2 is a diagram showing the configuration of a PSA separation-purification system integrated with a water gas shift reaction process according to an embodiment of the present invention, FIG. 3 is a diagram showing the configuration of a PSA separation-purification system integrated with a water gas shift reaction process according to another embodiment of the present invention, and FIG. 4 is a diagram showing the configuration of a PSA separation-purification system integrated with a water gas shift reaction process according to a further embodiment of the present invention.

Referring to FIG. 1, the conventional PSA separation-purification system integrated with the water gas shift reaction process includes a water gas shift reaction unit 10, a refrigerant supply unit 20, a condenser 30, and a PSA unit 50.

The conventional PSA separation-purification system integrated with the water gas shift reaction process is operated as follows: if a reaction effluent having a hydrogen content that is increased through a water gas shift reaction of carbon-monoxide containing gas with steam in the water gas shift reaction unit 10 is discharged, the discharged reaction effluent is supplied to the PSA unit 50, and the reaction effluent supplied to the PSA unit 50 is separated into hydrogen and carbon dioxide to be purified by a PSA method in which an adsorption process and a desorption process are alternately performed.

In this regard, the water gas shift reaction of the water gas shift reaction unit 10 is a reaction process in which carbon monoxide and steam react with each other to produce hydrogen and carbon dioxide. Since the reaction effluent discharged from the water gas shift reaction unit contains moisture that is an un-reacted substance and the temperature of the reaction effluent is high, the moisture of the reaction effluent should be essentially eliminated to supply the reaction effluent to the following PSA unit, and the condenser 30 for lowering the temperature and the refrigerant supply unit 20 for supplying a refrigerant to the condenser 30 should be provided.

Furthermore, in the conventional PSA separation-purification system integrated with the water gas shift reaction process, each adsorption column of the PSA unit 50 is independently configured and operated to perform the adsorption process during separation-purification and perform the desorption process during recycling. Thus, adsorption heat is generated during adsorption and heat is absorbed by desorption during desorption, so that the best separation-purification performance cannot be achieved. Thereby, heat of adsorption/desorption that are alternately performed by coupling two or more adsorption columns with each other is used, or a heat exchange process is performed using a cooling heat exchanger 90 equipped with a heating medium oil supply unit 91 and a cooling medium oil supply unit 92, or a heat source 95, so that a reduction in separation-purification performance by the adsorption heat or a reduction in recycling capability by the desorption cooling effect is minimized.

Therefore, the conventional PSA separation-purification system integrated with the water gas shift reaction process is problematic in that the structure and the cycle design of the PSA unit should be changed, a separate heat exchange source is required, and the scale of the system is increased.

Accordingly, inventors of the present invention found that desorption efficiency is improved by compensating for heat that is taken away in desorption during the recycling of a PSA unit 150, 250 or 350 using the heat of a reaction effluent discharged from a water gas shift reaction unit 110, 210 or 310, and the separation-purification performance of the PSA unit 150, 250 or 350 is improved by eliminating the adsorption heat of the PSA unit 150, 250 or 350 using a refrigerant for removing moisture in the reaction effluent of the water gas shift reaction unit 110, 210 or 310 during adsorption, so that it is possible to easily control the adsorption/desorption heat of the PSA unit without using additional components such as a heat exchanger or a heating means or without changing the structure of a system, and the best separation-purification performance can be achieved. On the basis of the finding, the present invention is completed.

According to the present invention, the water gas shift reaction unit 110, 210 or 310 and the water gas shift reaction are well known to those skilled in the art. The water gas shift reaction unit is filled with a water gas shift catalyst (not shown) that causes carbon-monoxide containing gas to react with steam, and a reaction effluent ($H_2$, $CO_2$, $H_2O$, etc.) having increased hydrogen content through a water gas shift reaction is discharged. In this regard, any gas may be applied to the carbon-monoxide containing gas, as long as the gas contains carbon monoxide, such as syngas or reformed gas.

The water gas shift reaction is a kind of exothermic reaction (41 kJ/mol). The reaction effluent of the water gas shift reaction unit produced by the reaction also maintains the temperature of 200° C. to 500° C., and contains moisture. Thus, in order to activate the water gas shift reaction and the following PSA, it is necessary to efficiently control heat generated during the reaction and efficiently eliminate moisture.

Therefore, according to the present invention, the reaction effluent of the water gas shift reaction is recovered to be used as a heat medium for the heat exchange of the desorption process of the PSA unit, so that the exothermic reaction efficiency of the water gas shift reaction unit can be improved due to the rapid heat recovery of the water gas shift reaction, and moisture remaining in the reaction effluent after the heat exchange is also in the form of water, so that it is easy to remove the moisture from the reaction effluent. In this regard, the temperature of the reaction effluent of the water gas shift reaction unit used for a heat medium for a desorption process heat exchange of the PSA unit is 200° C. to 500° C., preferably 200° C. to 350° C. If the temperature of the reaction effluent of the water gas shift reaction unit is less than 200° C., it is difficult to provide desorption heat to the PSA unit of the desorption process. Meanwhile, if the temperature is more than 500° C., it adversely affects the adsorbent filled in the PSA unit, thus hindering adsorption/desorption capability.

According to the present invention, the PSA unit 150, 250, or 350 is a common PSA type of separation-purification device equipped with one or more adsorption columns. Each adsorption column has an adsorbent 180, 280, or 380 therein to separate and purify hydrogen, carbon dioxide and other impurities by a difference in adsorptivity between substances under high-pressure conditions. Generally, in one adsorption column 170, a pressurization process, an adsorption process, a depressurization process, a rinse process or a transformed operation is switched into a short cycle, thus performing the separation-purification.

Furthermore, in order to increase the efficiency of a subsequent process, processes such as a product pressurization process, a cocurrent depressurization process, a pressure equalization process, a vacuum desorption process, or a strong adsorbate purge process may be added. In addition, combinations of these processes are possible.

Although the accompanying drawings of the present invention illustrate only two adsorption columns in the PSA unit, this is merely for the convenience of description. It is to be understood that at least one or more adsorption columns is included as described above.

Furthermore, the PSA 150, 250, or 350 has heat medium paths 160, 165, 260, 265, 360, or 365 for the heat exchange in multiple adsorption columns. Thus, in the desorption process, the reaction effluent discharged from the water gas shift reaction unit 110, 210, or 310 is used as the heat medium for the heat exchange and passes through the heat medium path for the heat exchange. In the adsorption, the refrigerant supplied from the refrigerant supply unit 120, 220 or 320 is used as the heat medium for the heat exchange and passes through the heat medium path for the heat exchange.

The heat medium paths 160, 165, 260, 265, 360, or 365 for the heat exchange may be of any type without limitation as long as it may exchange heat with the adsorbent of each adsorption column without interfering with the adsorption/desorption performance of the PSA unit. Preferably, a finned tube type and a shell and tube type may be used. More preferably, this may be a finned tube using a true counter current method, or a multi-tube hairpin type having a twisted tape vortex generator.

As such, the reaction effluent passing through the heat medium path for the heat exchange of the PSA unit is introduced into the condenser 130, 230, or 330 to eliminate moisture contained in the reaction effluent. After the reaction effluent is pressurized, it is supplied to the adsorption column in the adsorption process among the multiple adsorption columns of the PSA unit 150, 250, or 350. The reaction effluent may be pressurized by a method and a device that may be applied in the art, such as a compressor (not shown).

In this regard, the condenser 130, 230, or 330 may be supplied with the refrigerant from the refrigerant supply unit 120, 220, or 320. After the supplied refrigerant is used as the heat medium for the heat exchange in the PSA unit, moisture can be efficiently separated and removed from the reaction effluent introduced into the condenser.

Meanwhile, the refrigerant supply unit 120, 220, or 320 supplies the refrigerant to the PSA unit and/or the condenser. The refrigerant may use any kind of refrigerant without limitation as long as it is used as the heat medium for the heat exchange in the art. The refrigerant may be preferably coolant, brine, liquid hydrogen or the like, and more preferably coolant.

According to the present invention, since the coolant used as the refrigerant is not different from components contained in the reaction effluent produced in the water gas shift reaction unit, the adsorption/desorption heat of the PSA unit can be controlled using the same heat medium path for the heat exchange without installing a separate heat medium path for heat exchange.

The temperature of the refrigerant supplied from the refrigerant supply unit 120, 220, or 320 may be −30° C. to 30° C. If the temperature of the refrigerant supplied from the refrigerant supply unit is less than −30° C., it may be expensive to maintain the temperature of the refrigerant, and the amount of impurities adsorbed by the PSA unit may be increased. On the other hand, if the temperature is more than 30° C., the heat exchange with the PSA unit is insignificant, so that the adsorption efficiency of the PSA unit cannot be improved.

Furthermore, the PSA separation-purification system integrated with the water gas shift reaction process according to the present invention includes a controller (not shown) that may control a control sequence so that the supply and discharge of the reaction effluent and the refrigerant of the adsorption/desorption process and the water gas shift reaction process of each column alternate with each other. A valve (not shown) that controls the opening/closing and the flow rate according to the control sequence of the controller may be installed in the path of each system.

Hereinafter, a method of operating the PSA separation-purification system integrated with the water gas shift reaction process according to the present invention will be described in detail As shown in FIG. 2, the PSA separation-purification system integrated with the water gas shift reaction process according to the embodiment of the present invention supplies carbon-monoxide containing gas and steam to a water gas shift unit 110, and discharges a reaction effluent ($CO_2$, $H_2$, $H_2O$, etc.) having an increased hydrogen content from a water gas shift reaction (water gas shift reaction step). The discharged reaction effluent is supplied to a heat medium path 160 for heat exchange of the adsorption column 170 that is in a desorption step, among a plurality of adsorption columns 170 and 175 of the PSA unit 150, thus compensating for heat that is taken away in desorption during the recycling of the PSA unit, using the heat of the reaction effluent, and thereby improving desorption efficiency.

Subsequently, after the reaction effluent passing through the heat medium path 160 for the heat exchange of the adsorption column 170 that is in the desorption step is supplied to a condenser 130 to eliminate moisture contained in the reaction effluent (condensation step) and is pressurized, the reaction effluent is supplied to the adsorption column 175 that is in the adsorption process. The reaction effluent supplied to the adsorption column is separated into hydrogen and carbon dioxide to be purified through the PSA method (PSA step). Here, the refrigerant of the refrigerant supply unit 120 may be supplied to the heat medium path 165 for the heat exchange of the adsorption column 175 that is in the adsorption process, thus eliminating adsorption heat and improving separation-purification performance (refrigerant supply step). The refrigerant passing through the heat medium path 165 for the heat exchange of the adsorption column that is in the adsorption process may be introduced into the condenser 130 to be discharged to the outside or supplied to the refrigerant supply unit, so that the refrigerant may be reused.

Meanwhile, as shown in FIG. 3, the PSA separation purification system integrated with the water gas shift reaction process according to another embodiment of the present invention supplies carbon-monoxide containing gas and steam to a water gas shift unit 210, and discharges a reaction effluent ($CO_2$, $H_2$, $H_2O$, etc.) having an increased hydrogen content from a water gas shift reaction (water gas shift reaction step). The discharged reaction effluent is supplied to a heat medium path 260 for heat exchange of the adsorption column 270 that is in a desorption step, among a plurality of adsorption columns 270 and 275 of the PSA unit 250, thus compensating for heat that is taken away in desorption during the recycling of the PSA unit, using the heat of the reaction effluent, and thereby improving desorption efficiency.

Subsequently, after the reaction effluent passing through the heat medium path 260 for the heat exchange of the adsorption column 270 that is in the desorption step is supplied to a condenser 230 to eliminate moisture contained in the reaction effluent (condensation step) and is pressurized, the reaction effluent is supplied to the adsorption column 275 that is in the adsorption process, so that the reaction effluent is separated into hydrogen and carbon dioxide to be purified through the PSA method (PSA step). Here, the refrigerant of the refrigerant supply unit 220 passes through the condenser 230 and then is supplied to the heat medium path 265 for the heat exchange of the adsorption column that is in the adsorption process, thus eliminating adsorption heat and improving separation-purification performance (refrigerant supply step). The refrigerant passing through the heat medium path 265 for the heat exchange of the adsorption column that is in the adsorption process may be resupplied to the refrigerant supply unit or discharged to the outside.

Furthermore, as shown in FIG. 4, the PSA separation-purification system integrated with the water gas shift reaction process according to a further embodiment of the present invention supplies carbon-monoxide containing gas and steam to a water gas shift unit 310, and discharges a reaction effluent ($CO_2$, $H_2$, $H_2O$, etc.) having an increased hydrogen content from a water gas shift reaction (water gas shift reaction step). The discharged reaction effluent is supplied to a heat medium path 360 for heat exchange of the adsorption column 370 that is in a desorption step, among a plurality of adsorption columns 370 and 375 of the PSA unit 350, thus compensating for heat that is taken away in desorption during the recycling of the PSA unit, using the heat of the reaction effluent, and thereby improving desorption efficiency.

Subsequently, after the reaction effluent passing through the heat medium path 360 for the heat exchange of the adsorption column 370 that is in the desorption step is supplied to a condenser 330 to separate and eliminate moisture contained in the reaction effluent (condensation step) and is pressurized, the reaction effluent is supplied to the adsorption column 375 that is in the adsorption process, so that the reaction effluent is separated into hydrogen and carbon dioxide to be purified through the PSA method (PSA step). Here, the refrigerant of the refrigerant supply unit 320 is supplied to the condenser 330 and the adsorption column 375 that is in the adsorption process, so that the condenser condenses the moisture of the reaction effluent using the refrigerant to eliminate the moisture, and the heat medium path for the heat exchange of the adsorption column that is in the adsorption process eliminates adsorption heat using the supplied refrigerant, thus improving separation-purification performance (refrigerant supply step). Thereafter, the refrigerant passing through the heat medium path 365 for the heat exchange of the adsorption column that is in the adsorption process may be resupplied to the refrigerant supply unit or discharged to the outside.

As described above, since the PSA separation-purification process integrated with the water gas shift reaction process according to the present invention remains the same as that described in the corresponding PSA separation-purification system integrated with the water gas shift reaction process, those skilled in the art can clearly understand the process and thereby a duplicated description thereof will be omitted herein.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A PSA separation-purification system integrated with a water gas shift reaction process, the system comprising:
   a water gas shift reaction unit performing a water gas shift reaction of carbon-monoxide containing gas with steam to discharge a reaction effluent;
   a condenser separating and eliminating moisture contained in the reaction effluent;
   a PSA unit having at least one adsorption-desorption column in which an adsorption process and a/desorption processes are alternately performed to separate the reaction effluent from which the moisture has been eliminated into hydrogen and carbon dioxide, thus purifying the reaction effluent through a PSA method; and
   a refrigerant supply unit supplying a refrigerant to the condenser and/or the PSA unit,
   wherein the PSA unit comprises a heat medium path in the at least one adsorption-desorption column, so that the supplied refrigerant from the refrigerant supply unit passes through the heat medium path for adsorption heat exchange to eliminate adsorption heat in the adsorption process, and the reaction effluent of the water gas shift reaction unit passes through the heat medium path for desorption heat exchange to provide desorption heat to the PSA unit in the desorption process.

2. The PSA separation-purification system of claim 1, wherein the reaction effluent passing through the heat medium path of the PSA unit is supplied to the condenser to separate and eliminate the moisture from the reaction effluent, and then is supplied to the at least one adsorption-desorption column in the adsorption process such that the reaction effluent passing through the heat medium path is separated into hydrogen and carbon dioxide.

3. The PSA separation-purification system of claim 1, wherein the heat medium path is formed in a finned tube shape or in a shell and tube shape.

4. The PSA separation-purification system of claim 1, wherein a temperature of the reaction effluent discharged from the water gas shift reaction unit ranges from 200° C. to 500° C.

5. The PSA separation-purification system of claim 1, wherein a temperature of the supplied refrigerant ranges from −30° C. to 30° C.

6. The PSA separation-purification system of claim 1, wherein the refrigerant is a coolant.

7. A PSA separation-purification process integrated with a water gas shift reaction process, the process comprising:
   (a) a water gas shift reaction step of supplying carbon-monoxide containing gas and steam to a water gas shift reaction unit, and discharging a reaction effluent produced through a water gas shift reaction of the supplied carbon-monoxide containing gas and steam;
   (b) a condensation step of supplying the reaction effluent to a condenser, and separating and eliminating moisture contained in the supplied reaction effluent;
   (c) a PSA step of supplying the reaction effluent from which the moisture is eliminated to a PSA unit having at least one adsorption-desorption column where an adsorption process and a desorption processes are alternately performed, and separating the supplied reaction effluent from which the moisture has been eliminated into hydrogen and carbon dioxide through a PSA method; and
   (d) a refrigerant supply step of supplying a refrigerant to the PSA unit and/or the condenser of the condensation step,
   wherein step (c) provides desorption heat to the PSA unit by causing the reaction effluent of step (a) to pass through a heat medium path formed in the at least one adsorption-desorption column for desorption heat exchange during the desorption process of the PSA unit, and eliminates adsorption heat of the PSA unit by causing the refrigerant of step (d) to pass through the heat medium path formed in the at least one adsorption-desorption column for adsorption heat exchange during the adsorption process.

8. The PSA separation-purification process of claim 7, wherein the reaction effluent passing through the heat medium path at step (c) is supplied to the condenser to separate and eliminate moisture from the reaction effluent, and then is supplied to the at least one adsorption-desorption column in the adsorption process of the PSA unit to be separated into hydrogen and carbon dioxide.

9. The PSA separation-purification process of claim 7, wherein a temperature of the reaction effluent produced at the water gas shift reaction step ranges from 200° C. to 500° C.

10. The PSA separation-purification process of claim 7, wherein a temperature of the supplied refrigerant ranges from −30° C. to 30° C.

11. The PSA separation-purification process of claim 7, wherein the refrigerant is a coolant.

* * * * *